United States Patent Office 3,305,588
Patented Feb. 21, 1967

3,305,588
α-ACYLVINYLTHIOETHERS
Alfred A. Schleppnik, St. Louis, Mo., assignor to Monsanto Company, St. Louis, Mo., a corporation of Delaware
No Drawing. Filed Sept. 17, 1965, Ser. No. 488,277
9 Claims. (Cl. 260—590)

This invention relates to thioethers, more particularly it relates to novel α-acylvinylthioethers.

These new α-acylvinylthioethers, useful as metal cleaners and polar solvents can be prepared by reacting, under controlled conditions, suitable thioether ketones with suitable aldehydes. These novel compounds are represented by the formula

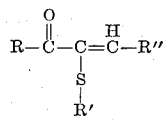

wherein R is alkyl containing from 1 to 8 carbon atoms, R' is selected from the group consisting of alkyl containing 1 to 8 carbon atoms, phenyl and lower alkyl phenyl and R" is selected from the group consisting of alkyl containing 1 to 8 carbon atoms, phenyl and lower alkyl phenyl and the chloro, bromo, nitro, lower alkoxy and di(lower alkyl) amino derivatives of both said phenyl and said lower alkyl phenyl. It is to be noted that, as used herein, "lower" alkyl means alkyl containing up to 4 carbon atoms.

The thioether ketones which are useful in the preparation of these novel compounds are represented by the formula

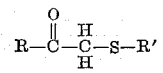

wherein R and R' have the same meaning as described above; that is, R and R" can each be, for example, a straight or branched chain alkyl such as methyl, ethyl, propyl, isopropyl, n-butyl, tert.-butyl, 2-ethylhexyl, n-octyl, 2-methylheptyl and the like. Additionally R' can be phenyl or lower alkyl phenyl such as tolyl, cumyl, xylyl and the like.

Compounds which are illustrative of said useful thioether ketones are 1-ethylthio-2-propanone, 1-phenylthio-2-propanone, 1-ethylthio-2-butanone, 2-phenylthio-3-heptanone, 2-methylthio-3-octanone, 1-n-butylthio-2-octanone, 1-tolylthio-2-propanone, 2-tert.-butylthio-3-hexanone, 3-cumylthio-4-octanone, 1-xylylthio-2-propanone and the like.

The aldehydes which are useful in the preparation of the novel α-acylvinylthioethers are represented by the formula

R"CHO wherein R" is as described as above; that is, R" can be a straight or branched chain alkyl, such as methyl, ethyl, propyl, tert.-butyl, pentyl, 2-methylpentyl, n-octyl, 2-ethylhexyl and the like. Additionally, R" can be phenyl or lower alkyl phenyl, such as tolyl, cumyl, xylyl and the like. Furthermore, R" can be the chloro, bromo, nitro, lower alkoxy and di(lower alkyl) amino derivatives of said phenyl and lower alkyl phenyl, such as nitrophenyl, chlorophenyl, bromophenyl, methoxyphenyl, nitrotolyl, chlorocumyl, dimethylaminophenyl, bromoxylyl, bromotolyl, nitrotolyl, methoxytolyl and the like.

Compounds which are illustrative of said useful aldehydes are acetaldehyde; isobutyraldehyde; 2,2-dimethylbutyraldehyde; propionaldehyde; butyraldehyde; benzaldehyde; p-nitrobenzaldehyde; p-methoxybenzaldehyde; p-chlorobenzaldehyde; o-dimethylaminobenzaldehyde; p-bromobenzaldehyde; o-chlorobenzaldehyde; o-methoxybenzaldehyde; p-tolualdehyde, cumaldehyde; and the like.

To prepare the compounds of this invention by reacting the suitable thioether ketones with the suitable aldehydes, it is necessary to effect intimate contact in the presence of a suitable catalytic base. The intimate contact is achieved by preparing a solution of the reactants in a suitable solvent. In general, when aromatic aldehydes are used, that is, when R" is other than alkyl, an inert aromatic solvent, such as benzene, toluene, xylene or the like, is preferred. When aliphatic aldehydes are used, that is, when R" is alkyl, aliphatic alcohols, such as methanol, ethanol, propanol and the like, have been found to possess suitable solvent properties and are therefore generally preferred. Although the foregoing solvents are preferred for minimum cost and ease of handling, any material which will dissolve the reactants and the catalytic base, and which does not react with either the reactants or the catalytic base, can be used.

As was mentioned previously, it is necessary to use a catalytic base when preparing the α-acylvinylthioethers of this invention. It has been found that when the aromatic aldehydes are used, suitable catalytic bases include piperidine, lower alkyl piperidine and the di(lower alkyl) amines. Compounds illustrative of said useful catalytic bases include piperidine, dimethylpiperidine, ethylmethylpiperidine, methylpiperidine, propylpiperidine, dimethylamine, diethylamine, dibutylamine, di-isopropylamine and the like.

When aliphatic aldehydes are used, it has been found that suitable catalytic bases include the lower alkoxides of sodium and potassium. Compounds illustrative of said useful catalytic bases include sodium ethoxide, potassium ethoxide, sodium methoxide, sodium butoxide, potassium butoxide and the like.

The following non-limiting examples illustrate the preparation of the novel compounds of this invention. All parts, percentages and proportions are by weight unless otherwise indicated.

EXAMPLE 1

3-phenylthio-4-phenylbut-3-ene-2-one

A solution of about 16.6 grams of 1-phenylthio-2-propanone, 10.6 grams of benzaldehyde, 1.0 gram of piperidine and 1.0 gram of acetic acid in about 43.0 grams of toluene is prepared. The solution is refluxed and the theoretical amount of water is collected. Distillation of the crude material by a short path apparatus gives 25.2 grams of a yellow liquid.

Elemental analysis of the yellow liquid compared to the theoretical content of 3-phenylthio-4-phenylbut-3-ene-2-one having an empirical formula, $C_{16}H_{14}OS$, is given below.

Calculated (percent): Carbon, 75.57; hydrogen, 5.55; sulfur, 12.58. Found (percent): Carbon, 75.08; hydrogen, 5.88; sulfur, 12.64.

Additional analyses by infrared absorption and nuclear magnetic resonance establish the product to be 3-phenylmercapto-4-phenylbut-3-ene-2-one.

EXAMPLE 2

3-phenylthio-4-(p-nitro)phenylbut-3-ene-2-one

About 7.6 grams of p-nitrobenzaldehyde and about 8.3 grams of 1-phenylthio-2-propanone are dissolved in about 45.0 grams of benzene. After about 0.5 gram of piperidine are added, the mixture is refluxed until the evolution of water ceases. The crude material is fractionally distilled to remove solvent. After solvent removal, a sample of the material, analyzed by standard elemental analyses, is found to be consistent with 3-phenylthio-4-(p-nitro)-phenylbut-3-ene-2-one (empirical formula, $C_{16}H_{13}O_3NS$). Additional analyses by infrared absorption and nuclear magnetic resonance further identify the compound as 3-phenylthio-4-(p-nitro)phenylbut-3-ene-2-one.

EXAMPLE 3

*3-ethylthio-4-phenylbut-3-ene-2-one*

A solution of 23.6 grams of 1-ethylthio-2-propanone and 21.2 grams of benzaldehyde in about 160 grams of benzene is prepared. After 1.0 gram of piperidine and 1.0 gram of acetic acid are added to the foregoing solution, the mixture is refluxed until the evolution of water ceases. The material is then washed with water and dilute hydrochloric acid and dried over sodium sulfate. Distillation of the washed material affords a product having a boiling range of 118–119° C. at 0.1 mm. Hg pressure. Elemental analyses for carbon, hydrogen and sulfur are consistent with 3 - ethylthio - 4 - phenylbut-3-ene-2-one, $C_{12}H_{14}OS$. Additional analyses by infrared absorption and by nuclear magnetic resonance also indicate the material is 3-ethylthio-4-phenylbut-3-ene-2-one.

EXAMPLE 4

*3-ethylthiopent-3-ene-2-one*

About 23.6 grams of 1-ethylthio-2-propanone and about 10 grams of acetaldehyde are dissolved in about 70 milliliters of ethanol. To the foregoing solution, about 3.0 grams of a 1 normal solution of sodium ethoxide in ethanol are added. After an exothermic reaction has occurred, distillation of the crude material at 3 mm. Hg pressure yields a compound having a boiling range of 44–47° C. at 0.4 mm. Hg pressure. Using the analytical techniques of Examples 1, 2 and 3, the compound is identified as 3-ethylthiopent-3-ene-2-one having an empirical formula, $C_7H_{12}OS$.

Other α-acylvinylthioethers are prepared using the same procedures as in Examples 1, 2, 3 and 4. Selected nonlimiting examples of these novel compounds are shown in the following table.

The α-acylvinylthioethers of this invention have properties which make them useful as intermediates in organic synthesis, as metal cleaners, and as polar solvents.

While the invention has been described with regard to certain specific embodiments, it is not so limited. It is to be understood that variations and modifications thereof may be made by those skilled in the art without departing from the spirit and scope of the invention.

What is claimed is:

1. An α-acylvinylthioether of the formula

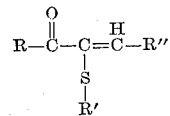

wherein R is an alkyl containing from 1 to 8 carbon atoms, R' is selected from the group consisting of alkyl containing 1 to 8 carbon atoms, phenyl and lower alkyl phenyl and R'' is selected from the group consisting of alkyl containing from 1 to 8 carbon atoms, phenyl, lower alkyl phenyl and the nuclearly substituted chloro, bromo, nitro, lower alkoxy and di(lower alkyl) amino derivatives of both said phenyl and said lower alkyl phenyl.

2. An α-acylvinylthioether of claim 1 wherein R' is phenyl.

3. An α-acylvinylthioether of claim 1 wherein R'' is phenyl.

4. An α-acylvinylthioether of claim 1 wherein R' and R'' are each phenyl.

5. An α-acylvinylthioether of claim 1 wherein R' is alkyl containing 1 to 8 carbon atoms.

6. An α-acylvinylthioether of claim 1 wherein R'' is alkyl containing 1 to 8 carbon atoms.

7. An α-acylvinylthioether of claim 1 wherein R' and R are each alkyl containing 1 to 8 carbon atoms.

8. An α-acylvinylthioether of claim 1 wherein R' is phenyl and R'' is alkyl containing 1 to 8 carbon atoms.

9. An α-acylvinylthioether of claim 1 wherein R' is alkyl containing 1 to 8 carbon atoms and R'' is phenyl.

TABLE

| Example | Reactants | Catalytic Base | α-Acylvinylthioether |
|---|---|---|---|
| 5 | 1-n-butylthio-2-butanone propionaldehyde | Sodium ethoxide | 4-n-butylthiohept-4-ene-3-one. |
| 6 | 1-methylthio-2-heptanone p-methoxybenzaldehyde | Piperidine | 2-methylthio-1-(p-methoxyphenyl)-oct-2-ene-3-one. |
| 7 | 1-p-tolylthio-2-butanone dimethylaminobenzaldehyde | Diethylamine | 2-p-tolylthio-1-1-(o-dimethylaminophenyl)-pent-2-ene-3-one. |
| 8 | 1-m-cumylthio-2-propanone p-chlorobenzaldehyde | Dimethylamine | 2-m-cumylthio-1-(p-chlorophenyl)-but-3-ene-3-one. |
| 9 | 1-phenylthio-2-butanone p-tolualdehyde | Dibutylamine | 2-phenylthio-1-p-tolylpent-2-ene-3-one. |
| 10 | 1-n-propylthio-2-propanone xylylaldehyde | Dimethylpiperidine | 2-n-propylthio-1-xylyl-but-2-ene-3-one. |
| 11 | 1-tert-butylthio-2-hexanone 2-chloro-p-tolyl-aldehyde | Piperidine | 2-tert-butylthio-1-(2-chloro-p-tolyl)-hept-2-ene-3-one. |
| 12 | 1-xylylthio-2-pentanone p-cumaldehyde | Di-isopropylamine | 2-xylylthio-1-p-cumylhex-2-ene-3-one. |
| 13 | 1-phenylthio-2-octanone butyraldehyde | Potassium methoxide | 5-phenylthio-dec-5-ene-6-one. |
| 14 | 1-isopropylthio-2-pentanone isobutyraldehyde | Sodium ethoxide | 2-methyl-4-isopropylthio-oct-4-ene-5-one. |
| 15 | 1-ethylthio-2-propanone octylaldehyde | Piperidine | 3-ethylthio-dodec-3-ene-2-one. |
| 16 | 1-methylthio-2-heptanone p-bromobenzaldehyde | do | 2-methylthio-1-(p-bromophenyl)-oct-2-ene-3-one. |
| 17 | 1-p-tolylthio-2-hexanone p-nitrobenzaldehyde | Ethylmethylpiperidine | 2-p-tolylthio-1-(p-nitrophenyl)-hept-2-ene-3-one. |
| 18 | 1-mesitylthio-2-butanone acetaldehyde | Potassium ethoxide | 3-mesitylthio-hex-3-ene-4-one. |
| 19 | 1-n-propylthio-2-hexanone benzaldehyde | Dimethylamine | 2-n-propylthio-1-phenylhept-2-ene-3-one. |
| 20 | 3-methyl-1-ethylthio-2-pentanone propionaldehyde | Sodium butoxide | 3-methyl-5-ethylthio-oct-5-ene-4-one. |

No references cited.

LEON ZITVER, *Primary Examiner*.

DANIEL D. HORWITZ, *Examiner*.